United States Patent Office 2,772,260
Patented Nov. 27, 1956

2,772,260
FUNGICIDAL COMPOSITION

Charles C. Yeager, Glen Ellyn, Ill., assignor to Scientific Oil Compounding Company, Inc., a corporation of Illinois No Drawing. Application October 29, 1953,
Serial No. 389,147

23 Claims. (Cl. 260—102)

This invention relates to novel reaction products of a complex metal ammine salt of a rosin amine and a water insoluble carboxylic acid soap, and to fungicidal and insecticidal compositions containing the same.

In accordance with the present invention, it has been found that the reaction products of a complex metal ammine salt of a rosin amine and a water insoluble carboxylic acid soap produced by reacting a water insoluble metal soap of a carboxylic acid with a complex metal ammine salt of a rosin amine formed by reacting a rosin amine with a metal salt capable of forming complexes with ammonia, have a fungicidal activity on plants, textiles, paper, leather, wood, etc., that is, in general, higher than that of the component materials from which the reaction products are prepared. Additionally, the novel reaction products of the present invention are not phytotoxic or exhibit substantially no phytotoxicity and hence are particularly suitable for incorporation in compositions designed for use as fungicidal plant sprays, or in other fungicidal and insecticidal compositions designed for the treatment of plant life. The novel reaction products of the present invention may be incorporated in varnishes, sealers, lacquers, paints, and the like, or in resins, waxes, greases and the like, and the resulting products are thereby made fungus-resistant.

In general, the novel reaction products of the present invention are prepared by reacting a complex metal ammine salt of a rosin amine with a water insoluble soap of a carboxylic acid, in the presence or absence of a solvent, at an elevated temperature at least sufficient to place the reactants into homogeneous solution. It is preferred to carry out the reaction at a temperature in the order of about 250° to 400° F. Lower temperatures may be used, but at a sacrifice of time. Higher temperatures, up to the lowest decomposition temperature of the reactants, may be used, if desired.

The proportions of the reactants may be varied widely, as desired. Thus, stoichiometrical proportions or an excess of one reactant with respect to the other may be used.

The complex metal ammine salt of a rosin amine may be introduced as such into the reaction with the water insoluble soap or it may be formed in situ in the reaction mix. These complex metal ammine salts may be made by reacting a rosin with a water soluble metal salt capable of forming complexes with ammonia, such as the copper, zinc, chromium, mercury, silver, aluminum, iron, cobalt, nickel, etc., salts, as described in Patent No. 2,513,429, granted July 4, 1950. Examples of these soluble salts are copper acetate, zinc acetate, the acetates of the other named metals, and formate, chloracetate, bromoacetate, chloride, sulfate, borate, carbonate, thiocyanate, etc., salts capable of forming complexes with ammonia.

Examples of the rosin amines which may be used to form the complex metal ammine salt reactants of the present invention include the rosin amines made from wood or gum rosin or various modified wood or gum rosins, such as dehydrogenated (disproportionated) rosin, hydrogenated rosin, or polymerized rosin. The rosin amines may also be the amines derived from the pure rosin acids in which abietyl amine is the amine derived from abietic acid, dehydroabietyl amine is the amine derived from dehydroabietic acid, dihydroabietyl amine is the amine derived from dihydroabietic acid, and tetrahydroabietyl amine is the amine derived from tetrahydroabietic acid. And they may be the secondary tertiary rosin amines in which the hydrogens attached to the nitrogen are replaced by lower alkyl and alkylol groups, such as methyl dehydroabietyl amine, ethyl dehydroabietyl amine, dimethyl dehydroabietyl amine, diethyl dehydroabietyl amine, isopropyl dehydroabietyl amine, butyl dehydroabietyl amine, hydroxymethyl dehydroabietyl amine, hydroxyethyl dehydroabietyl amine, and di(hydroxyethyl) dehydroabietyl amine. Similar secondary and tertiary rosin amines having the nucleus of abietic acid, dihydroabietic acid, tetrahydroabietic acid, and polymerized abietic acid may also be used, as may also the other amines referred to in the aforesaid patent.

The complex metal ammine salts which may be used as a reactant to form the reaction products of the present invention may be any one of those specifically named in the aforesaid patent, for example, dehydroabietyl ammino cupric acetate, dehydroabietyl ammino zinc chloride, dehydroabietyl ammino zinc acetate, dehydroabietyl ammino silver nitrate, dehydroabietyl ammino aluminum chloride, dehydroabietyl ammino mercuric acetate, etc., and the corresponding hydroabietyl ammino compounds.

The water insoluble soaps of carboxylic acids which are used as reactants in accordance with the present invention are water-insoluble soaps of a metal or a mixture of metals and a soap-forming acid or a mixture of such acids. Thus, the soaps may be soaps of calcium, barium, magnesium, mercury, lead, cadmium, silver, thallium, manganese, cobalt, nickel, iron, copper, tin, aluminum and the like. The preferred soaps are the copper, zinc and nickel soaps because the results obtained with these soaps are superior to those obtainable with the other soaps referred to herein.

The soap-forming acids used in forming the aforesaid water-insoluble metal soaps include mono-carboxylic acids having at least 6 carbon atoms in the carboxylic acid and being not otherwise substituted than with a hydrocarbon radical and the hydroxyl radical, such as caproic acid, caprylic acid, capric acid, lauric acid, myristic acid, palmistic acid, stearic acid, oleic acid, linoleic acid, linolenic acid, palmitoleic acid, melissic acid, hydroxystearic acid, ricinoleic acid, and the like, and mixtures thereof. The preferred soap-forming fatty acids or materials are those saturated and unsaturated higher aliphatic acids containing from twelve to eighteen carbon atoms, and rosin. Other soap-forming fatty acids which may be used in forming the metal soaps used in accordance with the present invention are the mixed higher fatty acids derived from animal or vegetable sources such as, for example, sardine and other fish oils, lard, coconut oil, sesame oil, soybean oil, tung oil, corn oil or partially or completely hydrogenated derivatives of such oils, fatty acids derived from carnauba, spermacetic, beeswax, candelilla wax and like waxes, and carboxylic acids derived from petroleum or other hydrocarbons. Other soap-forming acids which may be used are naphthenic acid, tall oil fatty acids, and hydroaromatic acids such as abietic acid and the like.

The following examples are illustrative of the method which may be used to form the complex metal ammine salt of a rosin amine-water insoluble soap reaction product of the present invention. In the examples the term "parts" refers to parts by weight.

Example 1

70 parts of magnesium acetate were added with stirring to 100 parts of 2-ethylhexoic acid at a temperature of 350° to 420° F. The heating and agitation were continued until the acetic acid liberated by the reaction was vaporized. There were then added 100 parts of dehydroabietyl amine and the temperature was permitted to drop to 260° F. At this point 55 parts of copper acetate were added and the temperature was raised to 340° F., where it was maintained for 15 minutes, whereupon a clear solution was obtained and heating discontinued. When the temperature dropped to 175° F., 235 parts of xylol were added. The resulting composition was liquid at room temperature.

The composition of Example 1 was tested to determined its fungicidal activity by treating duck samples with a xylol solution containing 5% of the reaction product, as follows:

Samples of 10 oz. specification army duck were cut into 10" x 30" pieces and the were washed in soap suds, rinsed and dried. The dried pieces were passed through the testing solution so that complete penetration was obtained. They were then passed through a wringer to remove the excess solution. Approximately a 50% wet-pickup was obtained. The treated fabric pieces were then dried for 24 hours to obtain complete solvent release.

The treated and dried pieces of duck were leached for 24 hours in running water and buried horizontally in a well composted soil consisting of 50% back loam and 50% pre-rotted manure, one-half inch below the soil surface. The moisture content of the soil was maintained at approximately 30–50%.

After 28 days incubation in the soil bed, the fabric pieces were removed and examined. There was no evidence of degradation found in the treated fabric pieces after burial and they had retained their original "hand" characteristics. A control 10" x 30" sample of the aforesaid army duck containing no treatment was buried at the same time as the treated pieces and under the same conditions. The control was completely destroyed, being in the form of small deteriorated pieces at the conclusion of the 28 day test period.

Prior to impregnating the piece of duck with the solution of Example 1, it and the untreated piece of duck was tested for tensile strengths on a 500 lb. vertical Scott tester. Each had a tensile strength of 296 lbs. After the 28 day burial period the treated duck and the control piece were removed from the soil, washed thoroughly in warm water to remove all soil particles and airdried at room temperature. Tensile strength on the treated piece was then taken on the same Scott tester. It had a tensile strength of approximately 298 lbs. The control piece was removed from the soil in small deteriorated pieces which had lost their fabric strength and hence were not tested. Each of these small pieces was badly stained. In contrast the treated piece was substantially free from stain.

*Example 2*

Example 1 was repeated except that 55 parts of zinc acetate were used in lieu of the copper acetate. A test solution and fabric pieces were made up and tested against an untreated fabric control piece, as described. The treated pieces showed no sign of degradation and no loss of "hand," whereas the control piece had completely deteriorated.

*Example 3*

Example 1 was repeated except that a corresponding amount of zinc oleate was used in lieu of the magnesium 2-ethylhexoate. A test solution and fabric pieces were made up and tested against an untreated fabric control piece, as described. The treated pieces showed no sign of degradation and no loss of "hand," whereas the control piece had completely deteriorated.

*Example 4*

Example 1 was repeated except that 100 parts of dihydroabietyl amine were used in lieu of the dehydroabietyl amine. A test solution and fabric pieces were made up and tested against an untreated fabric control piece, as described. The treated pieces showed no sign of degradation and no loss of "hand," whereas the control piece had completely deteriorated.

*Example 5*

Example 1 was repeated except that 100 parts of rosin amine made from wood rosin were used in lieu of the dehydroabietyl amine. A test solution and fabric pieces were made up and tested against an untreated fabric control piece, as described. The treated pieces showed no sign of degradation and no loss of "hand," whereas the control piece had completely deteriorated.

*Example 6*

Example 1 was repeated except that a corresponding amount of nickel 2-ethylhexoate was used in lieu of the magnesium 2-ethylhexoate and a corresponding amount of zinc chloride was used in lieu of the copper acetate. A test solution and fabric pieces were made up and tested against an untreated fabric control piece, as described. The treated pieces showed no sign of degradation and no loss of "hand," whereas the control piece had completely deteriorated.

*Example 7*

Example 1 was repeated except that 55 parts of silver nitrate were used in lieu of the copper acetate of Example 1. A test solution and fabric pieces were made up and tested against an untreated fabric control piece, as described. The treated pieces showed no sign of degradation and no loss of "hand," whereas the control piece had completely deteriorated.

*Example 8*

Example 1 was repeated except that 55 parts of mercuric acetate were used in lieu of the copper acetate of Example 1. A test solution and fabric pieces were made up and tested against an untreated fabric control piece, as described. The treated pieces showed no sign of degradation and no loss of "hand," whereas the control piece had completely deteriorated.

The reaction products of each of Examples 1 to 8, inclusive, in the form of the solutions described, were individually applied to wood samples 1" x 3" and leather squares 2" x 2" by soaking under vacuum for 20 minutes and drying for 6 hours. The treated specimens and untreated control specimens of similar dimensions were placed on a sterile nutrient agar medium with a pH of 5.5, which was used for the substratum in the petri dishes in which the specimens were placed. Each treated specimen and a control specimen were placed in a single petri dish. The specimens in each of these dishes were sprayed with a spore suspension of the following organisms and incubated at 30° C. for 14 days. *Chaetomium globosum, Penicillium citrinum, Aspergillus niger, Aspergillus ferreus, Trichoderma viride, and Aspergillus flavus.*

At the conclusion of this test period it was found that fungi were growing over the entire surface of the leather and wood control specimens and that no growth existed on the treated wood and leather specimens.

The reaction products of the present invention can be used to treat textiles, paper, leather and the like by impregnating or coating these materials with a solution or dispersion of the reaction product in a suitable vehicle. Thus, the solutions described above may be used to treat these materials. These solutions may be compounded with resins, animal, vegetable and fish oils, plasticizers, flameproofing agents, driers, anti-oxidants and the like, in accordance with known techniques, to impart to the solutions desired properties. For example, characteristics such as spread and flow of these solutions may be modified by the addition thereto of a fatty acid such as lauric acid, oleic acid, linseed oil fatty acids, hempseed oil fatty acids and like fatty acids having from 8 to 20 carbon atoms in the chain, and of a fatty acid glyceride, either raw or treated, such as raw or bodied linseed oil, China wood oil, castor oil, dehydrated castor oil, and the like. Compatible natural and synthetic resins such as rosin, phenol-aldehyde resins, urea-aldehyde resins, vinyl resins and the like, or compatible cellulose derivatives such as nitrocellulose, cellulose, cellulose acetate, ethly cellulose and the like may be incorporated in the solutions in varying proportions to meet any desired needs.

Plasticizers such as glycol, glycerine, pentaerythritol, sorbitol, mannitol and other compatible plasticizers may be added to the solutions. Suitable anti-oxidants which may be added to the solution are phenyl salicylate, tertiary butyl catechol and guaiacol, and suitable driers are zinc naphthenate, lead naphthenate, cobalt naphthenate and zinc octoate.

If it is desired to impart water-proof properties to the solutions of the reaction products of the present invention, various waxes such as paraffin wax, beeswax, carnauba wax, spermaceti wax, synthetic waxes, and the like, may be incorporated in the solutions in varying proportions to meet the desired needs.

By a proper choice of the solvents for the reaction products of the present invention and of suitable modifying agents, the resulting liquid compositions may be controlled as to consistency, drying time, flow, penetration, and the like.

Other solvents for the reaction products of the present invention are toluol, benzol, carbon tetrachloride, mineral spirits, naphtha, acetone, and the like.

Compositions containing reaction products of the present invention not only inhibit the growth of fungus organisms but may also kill the activity of all existing fungus growth on contact. Textiles, leather, wood, resins, etc., which have been treated with the reaction products of the present invention are not attacked to any appreciable extent by soil animal life and these treated materials resist the action of bacteria and insects. The reaction products of the present invention lend themselves for use as insecticides, in either dry or liquid form, and for preventing and combating diseases of plant life, both those diseases which attack the parts of plants above ground and diseases such as rot which attack underground parts of the plants. In dry form the active ingredient is mixed with an inert diluent such as bentonite, kieselguhr, talc, etc.

While the present invention has been described in connection with certain specific examples of methods of making the reaction products, it is obvious that my invention is not to be construed as limited to the specific materials disclosed in these examples or to the details of the methods set forth therein, since changes in materials, proportions and method details may be made without departing from the scope of my invention as defined in the appended claims.

I claim:

1. The method of forming a composition of matter comprising heating at an elevated temperature sufficient to place the reactants into homogeneous solution, said temperature being below the lowest decomposition temperature of the reactants, a metal ammine complex salt of a rosin amine, the metal of said metal ammine complex being from a water-soluble salt of a metal capable of forming a complex with ammonia and a water-insoluble mono-carboxylic acid soap having at least 6 carbon atoms in the carboxylic acid, said carboxylic acid being not otherwise substituted than with a hydrocarbon radical and the hydroxyl radical.

2. The product produced by the method of claim 1.

3. The method of forming a composition of matter comprising heating at an elevated temperature sufficient to place the reactants into homogeneous solution, said temperature being below the lowest decomposition temperature of the reactants, a copper ammine complex salt of a rosin amine and a water-insoluble mono-carboxylic acid soap having at least 6 carbon atoms in the carboxylic acid, said carboxylic acid being not otherwise substituted than with a hydrocarbon radical and the hydroxyl radical.

4. The product produced by the method of claim 3.

5. The method of forming a composition of matter comprising heating at an elevated temperature sufficient to place the reactants into homogeneous solution, said temperature being below the lowest decomposition temperature of the reactants, a zinc ammine complex salt of a rosin amine and a water-insoluble mono-carboxylic acid soap having at least 6 carbon atoms in the carboxylic acid, said carboxylic acid being not otherwise substituted than with a hydrocarbon radical and the hydroxyl radical.

6. The product produced by the method of claim 5.

7. The method of forming a composition of matter comprising heating at an elevated temperature sufficient to place the reactants into homogeneous solution, said temperature being below the lowest decomposition temperature of the reactants, a silver ammine complex salt of a rosin amine and a water-insoluble mono-carboxylic acid soap having at least 6 carbon atoms in the carboxylic acid, said carboxylic acid being not otherwise substituted than with a hydrocarbon radical and the hydroxyl radical.

8. The product produced by the method of claim 7.

9. The method of forming a composition of matter comprising heating at an elevated temperature sufficient to place the reactants into homogeneous solution, said temperature being below the lowest decomposition temperature of the reactants, a mercury ammine complex salt of a rosin amine and a water-insoluble mono-carboxylic acid soap having at least 6 carbon atoms in the carboxylic acid, said carboxylic acid being not otherwise substituted than with a hydrocarbon radical and the hydroxyl radical.

10. The product produced by the method of claim 9.

11. The method of forming a composition of matter comprising heating at an elevated temperature sufficient to place the reactants into homogeneous solution, said temperature being below the lowest decomposition temperature of the reactants, an aluminum ammine complex salt of a rosin amine and a water-insoluble mono-carboxylic acid soap having at least 6 carbon atoms in the carboxylic acid, said carboxylic acid being not otherwise substituted than with a hydrocarbon radical and the hydroxyl radical.

12. The product produced by the method of claim 11.

13. The method of forming a composition of matter comprising heating at an elevated temperature sufficient to place the reactants into homogeneous solution, said temperature being below the lowest decomposition temperature of the reactants, a rosin amine, a water soluble salt of a metal capable of forming a complex with ammonia and a water-insoluble mono-carboxylic acid soap having at least 6 carbon atoms in the carboxylic acid, said carboxylic acid being not otherwise substituted than with a hydrocarbon radical and the hydroxyl radical.

14. The method of forming a composition of matter comprising heating at an elevated temperature sufficient to place the reactants into homogeneous solution, said temperature being below the lowest decomposition temperature of the reactants, dehydroabietyl amine, copper acetate and magnesium 2-ethylhexoate.

15. The product produced by the method of claim 14.

16. The method of forming a composition of matter comprising heating at an elevated temperature sufficient to place the reactants into homogeneous solution, said temperature being below the lowest decomposition temperature of the reactants, dehydroabietyl amine, zinc acetate and magnesium 2-ethylhexoate.

17. The product produced by the method of claim 16.

18. The method of forming a composition of matter comprising heating at an elevated temperature sufficient to place the reactants into homogeneous solution, said temperature being below the lowest decomposition temperature of the reactants, dehydroabietyl amine, mercuric acetate and magnesium 2-ethylhexoate.

19. The method of forming a composition of matter comprising heating at an elevated temperature sufficient to place the reactants into homogeneous solution, said temperature being below the lowest decomposition temperature of the reactants, dehydroabietyl amine, a water soluble copper salt and a water-insoluble mono-carboxylic acid soap having at least 6 carbon atoms in the carboxylic acid, said carboxylic acid being not otherwise substituted than with a hydrocarbon radical and the hydroxyl radical.

20. The method of forming a composition of matter comprising heating at an elevated temperature sufficient to place the reactants into homogeneous solution, said temperature being below the lowest decomposition temperature of the reactants, dehydroabietyl amine, a water soluble zinc salt and a water-insoluble mono-carboxylic acid soap having at least 6 carbon atoms in the carboxylic acid, said carboxylic acid being not otherwise substituted than with a hydrocarbon radical and the hydroxyl radical.

21. The method of forming a composition of matter comprising heating at an elevated temperature sufficient to place the reactants into homogeneous solution, said temperature being below the lowest decomposition temperature of the reactants, dehydroabietyl amine, a water soluble silver salt and a water-insoluble mono-carboxylic acid soap having at least 6 carbon atoms in the carboxylic acid, said carboxylic acid being not otherwise substituted than with a hydrocarbon radical and the hydroxyl radical.

22. The method of forming a composition of matter comprising heating at an elevated temperature sufficient to place the reactants into homogeneous solution, said temperature being below the lowest decomposition temperature of the reactants, dehydroabietyl amine, a water soluble mercury salt and a water-insoluble mono-carboxylic acid soap having at least 6 carbon atoms in the carboxylic acid, said carboxylic acid being not otherwise substituted than with a hydrocarbon radical and the hydroxyl radical.

23. The method of forming a composition of matter comprising heating at an elevated temperature sufficient to place the reactants into homogeneous solution, said temperature being below the lowest decomposition temperature of the reactants, dehydroabietyl amine, a water soluble aluminum salt and a water-insoluble mono-carboxylic acid soap having at least 6 carbon atoms in the carboxylic acid, said carboxylic acid being not otherwise substituted than with a hydrocarbon radical and the hydroxyl radical.

References Cited in the file of this patent
UNITED STATES PATENTS

| | | |
|---|---|---|
| 2,490,924 | Schertz | Dec. 13, 1949 |
| 2,490,925 | Schertz | Dec. 13, 1949 |
| 2,492,939 | Schertz | Dec. 27, 1949 |
| 2,513,429 | Rosher | July 4, 1950 |
| 2,623,870 | Sanders | Dec. 30, 1952 |